Dec. 28, 1948.    E. M. S. McWHIRTER ET AL    2,457,166
POLYPHASE OSCILLATION GENERATOR
Filed Nov. 27, 1945
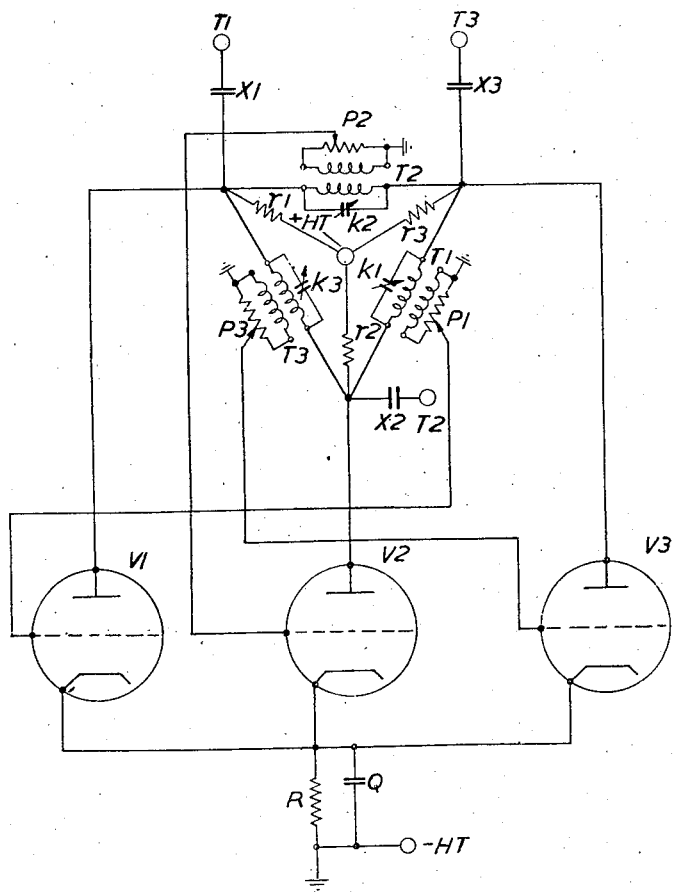
INVENTOR
ERIC MALCOLM SWIFT McWHIRTER
ROLAND HARRIS DUNN
BY
ATTORNEY Patented Dec. 28, 1948

2,457,166

UNITED STATES PATENT OFFICE 2,457,166

POLYPHASE OSCILLATION GENERATOR

Eric Malcolm Swift McWhirter and Roland Harris Dunn, London, England, assignors, by mesne assignments, to International Standard Electric Corporation, New York, N. Y., a corporation of Delaware Application November 27, 1945, Serial No. 631,154
In Great Britain May 29, 1942

7 Claims. (Cl. 250—36)

The present invention relates to thermionic valve oscillation generators, and particularly to multi-phase high frequency oscillators.

For high frequency testing and other purposes a three-phase system of currents is sometimes required, and three-phase valve generators have been previously employed, but they have been found difficult to use and adjust at high frequencies because of the necessity for controlling those factors whose effects become appreciable at such frequencies. In the present invention, arrangements of the same general type are employed, but modifications are introduced whereby the above-mentioned factors may be better controlled.

A particular case in which a three-phase high-frequency oscillator is of use, is in connection with protective arrangements for three-phase power lines for detecting and isolating faults. For this purpose it has been frequently the practice to make use of the unbalance in the phases of the power supply caused by faults to operate relay systems, but considerable difficulties are encountered in this method and it has been found much simpler and better to divide the line into short sections by filters or the like and to supply carrier currents separately to each section which currents will be subjected to the same fault conditions and can be adapted to isolate the faulty sections through suitable relays. For this purpose a three-phase high-frequency generator is needed. Such a generator would, however, be of quite general application.

The principles of the invention may also be extended to oscillators producing any desired odd number of phases.

According to the invention there is provided a multi-phase high-frequency oscillator comprising an odd number of similar thermionic valve amplifying stages each having a control grid and an output plate, the same number of similar transformers each having primary and secondary windings, means to connect the primary windings of said transformers in series in a closed ring, means to connect the plates respectively to the junctions of said primary windings, and means to connect the control grid of each stage to the secondary winding of the transformer whose primary winding connects the plates of another two stages, so that the total output current of the said stage is in phase opposition to the vector sum of the plate voltages on said plates and proportional in magnitude thereto.

The invention will be more clearly understood by reference to the following detailed description of the accompanying drawing which shows a schematic circuit diagram of an embodiment of the invention.

Three similar transformers $T_1$, $T_2$ and $T_3$ have their primary windings connected in delta formation the corners of the delta being connected respectively to the plates of three valves $V_1$, $V_2$ and $V_3$ as shown. The plates are fed from the positive terminal of the high tension supply through a star connected arrangement of three equal resistances $r_1$, $r_2$ and $r_3$. The transformers are respectively tuned to the desired frequency by means of the condenser $K_1$, $K_2$ and $K_3$ shunting the primary windings. The secondary windings are respectively connected to potentiometers $P_1$, $P_2$ and $P_3$, one end of each being connected to earth, and the sliding contacts are respectively connected to the grids of the valves $V_1$, $V_2$ and $V_3$. The cathodes of the valves are biassed in the usual way by means of the resistance R shunted by the by-pass condenser Q. If preferred, the secondary windings of the transformers could be tuned instead of the primary windings.

It will be noted that the transformer connections have been made in such a way that the voltage applied to the grid of each valve is derived from the combined plate voltages of the other two valves. At the resonance frequency, each transformer will present an impedance which is substantially a pure resistance, so that the voltage across each potentiometer will be proportional to the vector sum of the two corresponding plate voltages, and if the connection of the secondary windings be correctly poled, will be also in the same phase. Thus for each valve the voltage of the grid (which is connected to the sliding contact of the corresponding potentiometer) will be in phase with the rector sum of the plate voltages of the other two valves, and if these are equal in magnitude and differ in phase by $2\pi/3$, the plate voltage of that valve will differ in phase from either by $2\pi/3$ owing to the phase reversal in the valve.

In setting up the circuit the three transformers are first tuned to the desired frequency, and the three potentiometers are then adjusted with the help of an oscilloscope until the three phases are obtained with equal amplitude and equally spaced in phase.

The principle of the invention may be extended to the design of an oscillator having any odd number of phases $(2n-1)$. In the embodiment shown $(2n-1)$ valves and $(2n-1)$ transformers would be arranged in a regular polygon. The grid of each valve would be connected to the transformer joining the two valves $(n-1)$ places away from it, and the corresponding potentiometer P adjusted to produce the proper plate voltages.

It will further be evident that the $n$th valve could be likewise controlled from the 2nd and $(2n-2)$th valves, or the 3rd and the $(2n-3)$th of the $r$th and the $(2n-r)$th valves, since in all these cases the reversed resultant will be in the desired direction. However, when $r$ gets near to $n/2$ the resultant may be too small in magnitude for oscillations to be possible. When $r$ is greater than $n/2$ the resultant changes sign, but, oscillations would be again obtainable simply by reversing one of the windings of each transformer.

In the circuits which have been described, the valves have been shown for clearness as triodes having indirectly heated cathodes, the heating circuits being conventional and therefore not shown. In many cases, particularly at high frequencies, screen grid valves or pentodes may be more suitable and the circuits described will be unaffected except for the addition of the polarising arrangements for the extra electrodes, which may be supplied in any known way. Directly heated filamentary cathodes could also be used with appropriate arrangements. It will be evident also that the circuits are capable of various modifications in other ways to suit particular cases, while retaining the features of the invention as described. For example, each valve might be replaced by an amplifying stage comprising two or more valves connected in tandem, so that the grid or grids of the first tandem connected valve and the plate of the last would correspond respectively to the grid or grids and to the plate of the valve so replaced; and attenuators could be used instead of the potentiometers.

What is claimed is:

1. A multi-phase high-frequency oscillator comprising an odd plurality of similar thermionic valve amplifying stages each having a control grid and an output plate, the same number of similar transformers each having primary and secondary windings, means to connect the primary windings of said transformers in series in a closed ring, means to connect the plates respectively to separate junctions of said primary windings, and means to connect the control grid of each stage to the secondary winding of the transformer whose primary winding connects the plates of another two stages, so that the total output current of the said stage is in phase opposition to the vector sum of the plate voltages on said plates and proportional in magnitude thereto.

2. An oscillator according to claim 1, comprising $(2n-1)$ valve stages and means to apply the output voltages of any two adjacent stages to control the output current of that stage which is $(n-1)$ places from either around the ring, where $n$ is any whole number greater than 1.

3. A three-phase high-frequency oscillator comprising three thermionic valve amplifying stages each having a control grid and an output plate, three similar transformers each having primary and secondary windings, means to interconnect said plates through said primary windings connected in delta, and means to connect the control grid of each stage to the secondary winding of the transformer whose primary winding connects the plates of the other two stages, so that the total output current of the said stage is in phase opposition to the vector sum of the plate currents of said other two stages and proportional in magnitude thereto.

4. An oscillator according to claim 3, in which a variable condenser is provided to shunt one of the windings of each transformer to tune it to the desired oscillation frequency.

5. An oscillator according to claim 3, in which the secondary winding of each transformer is connected to a potentiometer having an adjustable contact connected to the said control grid.

6. An oscillator according to claim 3, in which the variable condenser is provided to shunt one of the windings of each transformer to tune it to the desired oscillation frequency and in which the secondary winding of each transformer is connected to a potentiometer having an adjustable contact connected to the said control grid.

7. An oscillator according to claim 3, in which the plates of the three valves are fed from a high tension polarising source through star connected resistances.

ERIC MALCOLM SWIFT McWHIRTER.
ROLAND HARRIS DUNN.

REFERENCES CITED

The following references are of record in the file of this patent:

UNITED STATES PATENTS

| Number | Name | Date |
|---|---|---|
| 1,972,535 | Page | Sept. 4, 1934 |
| 2,006,346 | Curtis | July 2, 1935 |
| 2,393,331 | McWhirter et al. | Jan. 22, 1946 |